United States Patent [19]
Plaskon et al.

[11] Patent Number: 6,086,714
[45] Date of Patent: *Jul. 11, 2000

[54] PROCESS FOR ADJUSTING THE ALKALINITY OF PULP SLURRY IN A BROKE PULPER USING CARBON DIOXIDE

[75] Inventors: David John Plaskon, Brick, N.J.; Richard Joseph Piazza, Harleysville, Pa.

[73] Assignee: Praxair Technology, Inc., Danbury, Conn.

[*] Notice: This patent issued on a continued prosecution application filed under 37 CFR 1.53(d), and is subject to the twenty year patent term provisions of 35 U.S.C. 154(a)(2).

[21] Appl. No.: 08/957,035

[22] Filed: Oct. 24, 1997

[51] Int. Cl.[7] ....................................................... D21B 1/34

[52] U.S. Cl. .................................. 162/63; 162/70; 162/90; 162/191

[58] Field of Search .................................... 162/7, 9, 191, 162/8, 4, 90, 63, 29, 38, 40, 20; 241/18, 21, 28

[56] References Cited

U.S. PATENT DOCUMENTS

| | | | |
|---|---|---|---|
| 5,674,358 | 10/1997 | Espy | 162/7 |
| 5,691,193 | 11/1997 | Paice et al. | 162/9 |

*Primary Examiner*—Steven Alvo
*Attorney, Agent, or Firm*—Donald T. Black

[57] ABSTRACT

A method for adjusting the alkalinity of a pulp slurry in a broke pulper, and more particularly, to adjusting the pH of the pulp slurry using carbon dioxide.

10 Claims, 1 Drawing Sheet

PROCESS FOR ADJUSTING THE ALKALINITY OF PULP SLURRY IN A BROKE PULPER USING CARBON DIOXIDE

FIELD OF THE INVENTION

The present invention relates to a method for adjusting the alkalinity of a pulp slurry in a broke pulper, and more particularly, adjusting the pH of the pulp slurry comprising contacting a portion of the pulp slurry with carbon dioxide and mixing the thus treated portion with the remaining pulp slurry.

BACKGROUND OF THE INVENTION

Broke is defined as partly or completely manufactured paper or paper board that is discarded from any point in the manufacturing or finishing process. The term also applies to the furnish made by repulping these materials. Wet broke is taken from the forming and pressing sections, while dry broke emanates from the dryers, calendars, reel, winder and finishing operations in a paper mill.

A broke handling and repulping system is an essential feature on any paper machine. Broke may also include intramill paper and paper board, purchased pulp, waste papers, as well as other cellulosic materials that may be suitable for use in the preparation of pulp for use in the manufacture of paper.

Pulp may be defined as wood fibers capable of being put into a slurry or suspended and then deposited on a screen for filter to form a sheet of paper. The methods employed to accomplish the pulping step typically involve chemical and/or mechanical treatment to reduce the feedstock to individual pulp fibers. In broke pulping, such treatment is directed to paper and paper board derived from trimmings, damaged paper, purchased pulps or paper stocks, and the like. Broke is extremely valuable and is returned to the paper production process by mixing it with the pulp furnish.

Broke is typically repulped in a batch or continuous process in a piece of machinery which disintegrates the paper by combining the broke with water and an alkaline material and subjecting the mixture to suitable agitation to reduce the paper into its individual cellulosic fibers. As a result of using the alkaline material, to break down the pulp, the pulp slurry has a relatively high pH which must be neutralized before the pulp is reintroduced into the paper process.

A typical broke pulping system is shown in FIG. 1. The typical pulper comprises a vessel 10, impeller 12, a recirculation line 14, a broke chute 18, a dump line 20, a water inlet 22, an alkaline material inlet 24, and a sulfuric acid inlet 26. In the traditional system, bails of broke are weighed and dropped into vessel 10 via broke chute 18 along with a suitable quantity of white water and an alkaline material, such as a sodium hydroxide solution. Impeller 12, is then initiated, agitating the mixture of broke, water, and sodium hydroxide solution, at a sufficient speed to provide a shearing force sufficient to break down the pulp. The impeller 12, is driven in a flow pattern such that the a portion of the pulp slurry is drawn through the impeller and into outlet line 16 to recirculation line 14 whereby said portion of the pulp slurry is recirculated back into vessel 10. Vessel 10 may be heated, such as by the addition of steam, through line 28, or alternative heating means known to those of skill in the art. After pulping is completed, the pulp slurry is discharged into a dump chest via dump line 20. Prior to removing the pulp from the vessel 10, the pulp is neutralized by adding an acid, such as sulfuric acid, through the recirculation line 14, dump line 20, or directly metered into the vessel 10.

Sulfuric acid is generally preferred for use in neutralization by the pulp and paper industry, but presents material handling, corrosion, safety, and environmental problems. Due to such manufacturing, safety and environmental concerns, alternative materials and processes are being sought to replace the use of acids such as sulfuric acid in the neutralization process in broke pulping.

Although it is well known that carbon dioxide may be used as an acidifying agent in aqueous systems, it has not been used in the neutralization process in broke pulping due to its expected low efficiency in such a high temperature environment and its cost relative to sulfuric acid. Until the present invention, carbon dioxide was also not considered as a viable alternative for acids such as sulfuric acid in the typical neutralization process in broke pulping due the relatively poor mixing and limited contact time of the acidifying agent with the pulp slurry.

SUMMARY OF THE INVENTION

The present invention is directed to an improved process for adjusting the alkalinity of a pulp slurry in a broke pulper. The improved process provides the means for efficiently adjusting the alkalinity of the pulp slurry using carbon dioxide. The improved process provides for enhanced mixing and increased contact time of the carbon dioxide with the pulp slurry resulting in substantially increased efficiency of the carbon dioxide as the acidifying agent in the neutralization process in broke pulping.

DETAILED DESCRIPTION OF A PREFERRED EMBODIMENT

Figure 1:
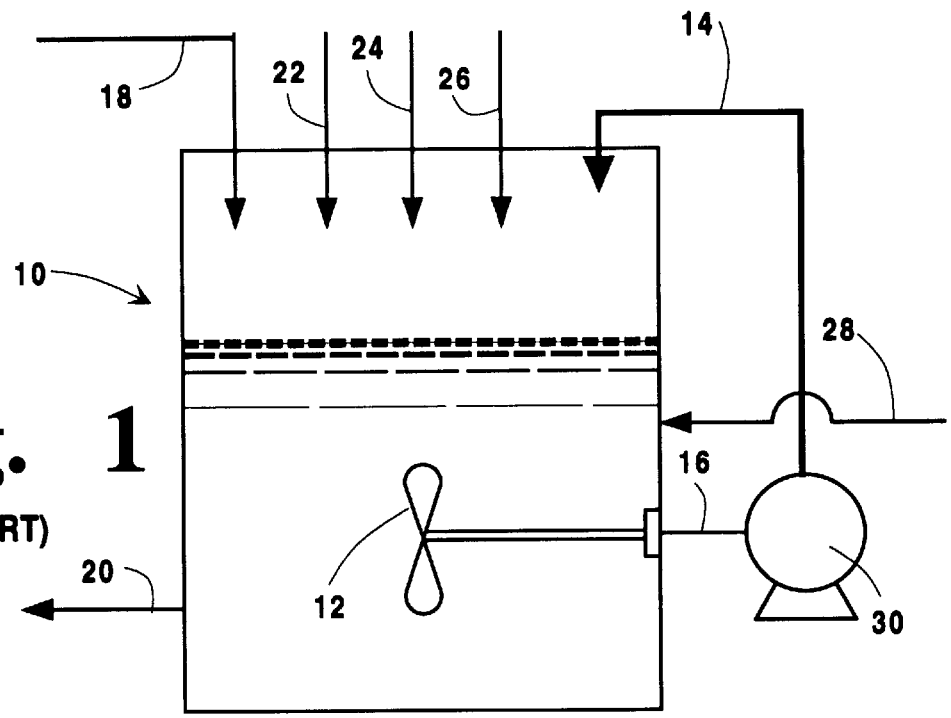
FIG. 1 is a schematic of a typical broke pulping process system.
Figure 2:
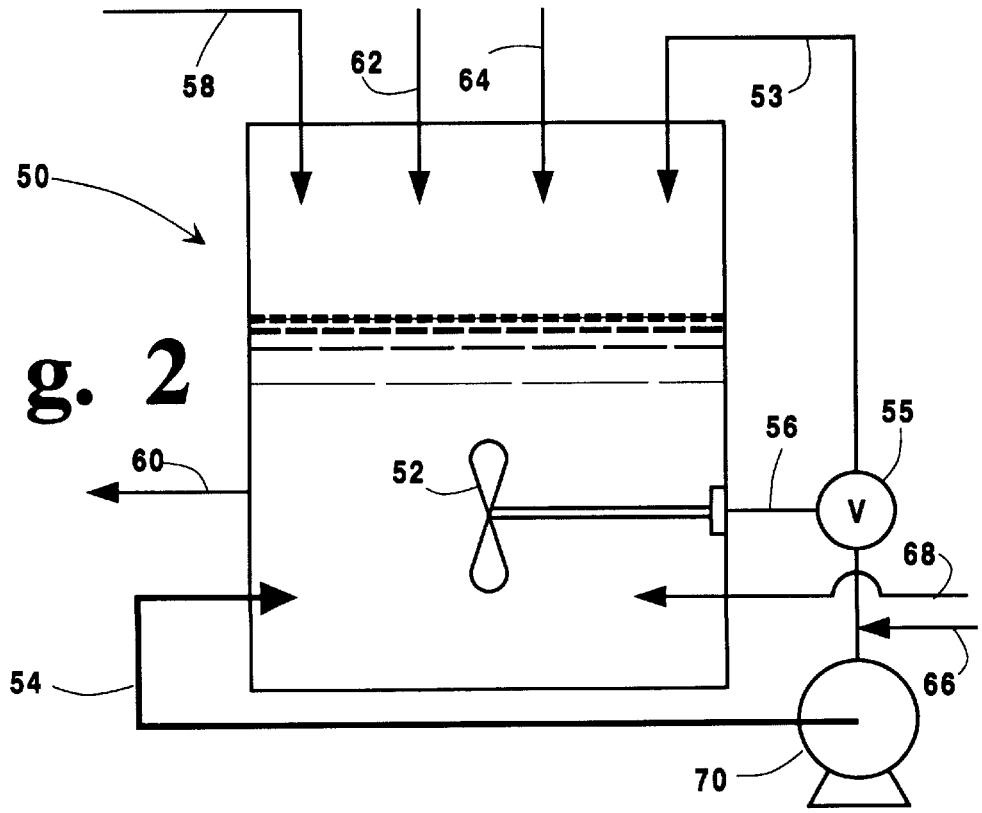
FIG. 2 is a schematic of the improved process of broke pulping according to the present invention.

The improved process of the present invention is depicted in FIG. 2. In FIG. 2, bails of broke are weighed and dropped into vessel 50 via broke chute 58. White water and an alkaline material such as a sodium hydroxide solution are added into vessel 50 via inlet lines 62 and 64, respectively. Impeller 52, is then initiated, agitating the mixture of broke, water, and sodium hydroxide solution, at a sufficient speed to provide a shearing force sufficient to break down the pulp. The impeller 52, is driven in a flow pattern such that a portion of the pulp slurry is drawn through the impeller and into outlet line 56 to the first recirculation line 53 whereby said pulp slurry is recirculated to vessel 50. Vessel 50 may be heated, such as by the addition of steam, through line 68, or alternative heating means known to those of skill in the art.

In the process of the present invention, after pulping is completed, the portion of the pulp slurry being recirculated into vessel 50 is diverted at outlet 56 to second recirculation line 54. Carbon dioxide is contacted with the recirculating portion of the pulp slurry in the second recirculation line 54 via inlet line 66, which is located at or near outlet 56, by means suitable for mixing the carbon dioxide into the recirculating pulp slurry. The carbon dioxide and recirculating pulp slurry mixture is returned to vessel 50 at a point below the level of the remaining pulp slurry into vessel 50. The process is continued until a desired pH is reached. The neutralized pulp slurry is then discharged into a dump chest via dump line 60.

As contemplated by the inventors, the portion of the pulp slurry to be recirculated may be removed from vessel 50 at any point that is below the level of the remaining pulp slurry, contacted with carbon dioxide and recirculated to another point of vessel 50 below the level of said remaining pulp slurry. As contemplated, the outlet stream may include dump line 60.

Alternatively, the vessel contains at least one additional recirculation line for recirculating another portion of the pulp slurry to the vessel at a point below the remaining pulp slurry. Furthermore, this alternative embodiment facilitates injecting carbon dioxide into the second recirculation line and the additional recirculation line.

Also as contemplated by the inventors, carbon dioxide used in the process of the present invention, may be in the form of a liquid or vapor, or combinations thereof.

To provide enhanced mixing and dissolution of the carbon dioxide in the pulp slurry, the pulp slurry may be cooled thereby increasing the solubility of the carbon dioxide in the aqueous pulp slurry. Any means of temperature reduction known in the art may be used. In a preferred embodiment, the white water used for the broke pulping is separated into a larger and smaller portion, wherein the larger portion is used in pulping, and the smaller portion is used in a quenching step prior to neutralization. In this manner, the pulp slurry may be cooled by the addition of the white water following pulping without overly diluting the pulp slurry.

In the process of the present invention, it is preferred that the pulp slurry be cooled below the typical pulping temperature of about 150° to about 210° F. It is yet more preferred that the pulp slurry be cooled to between about 70° to about 180° F., and most preferred that the pulp slurry be cooled to about 90° to about 120° F.

In the process of the present invention, the desired pH is in the range of about pH 10.0 to about pH 6.5, with a preferred range of about pH 7.0 to about pH 9.0, and a most preferred pH of about pH 8.0.

The process of the present invention may be used on any cellulosic material including, for example, virgin materials from wood and plant sources (e.g., cotton), pre-consumer waste from papermaking, as well as recycled materials.

There are numerous advantages to the use of the improved process of the present invention. The improvement to the broke pulping process realized by this invention provides for more efficient adjustment of the alkalinity of the broke pulp through the use of carbon dioxide. By the use of the present invention, carbon dioxide also provides a replacement for other acids such as sulfuric acid, customarily used in the broke pulping process, that have created problems in material handling, corrosion, safety, and the environment.

The process of the present invention is further illustrated in the following example provided for illustration only rather than any limitation on the scope of the claims.

EXAMPLE

Bails of broke (derived from internal pre-consumer waste) were weighed and dropped into a pulper vessel containing about 2000 gallons of white water. Sixteen gallons of sodium hydroxide solution were then added to the vessel. The lid to the pulping vessel was then closed and the pulping sequence was begun, starting the mechanical pulping of the broke. The impeller, having claw-like protrusions, was initiated to induce a flow of about 500 gallons per minute in the direction of an outlet line to the recirculation line. The pulp slurry directed through the recirculation line was deposited back into the top of the pulping vessel. Temperature of the pulping vessel was maintained at about 180° F by the addition of steam into the vessel. The pulping process was continued for about 45 minutes to about 1 hour, until the operator determined, by visual inspection, that all of the broke had been disintegrated into pulp fibers. At the conclusion of the pulping stage, about 1300 gallons of water were added to cool the pulp.

Following cooling of the pulp slurry, the impeller was re-initiated to resume flow of the pulp slurry through the outlet line into the recirculation line. At this point, however, the flow of the pulp slurry was diverted into a second recirculation line, contacted with a mixture of liquid and vapor phase carbon dioxide and returned to the vessel at a point below the level of the remaining pulp slurry in the vessel. The flow of the carbon dioxide was maintained for about 15 minutes until the pH of the entire pulp slurry in the vessel had reached about pH 8.0. The neutralized pulp slurry was then removed to a broke dump chest for addition to virgin pulp for use in making paper.

What is claimed is:

1. In a method for pulping broke in a pulper wherein said pulper comprises a vessel, an impeller and a first recirculation line, wherein said impeller is located within said vessel, and said first recirculation line is juxtaposed at a first end to said vessel adjacent to said impeller and juxtaposed at another end to said vessel above the level of said broke in said pulper, wherein said broke is combined with water and an alkaline material in said vessel and mixed by said impeller to form an alkaline pulp slurry and wherein a portion of said pulp slurry is drawn through said impeller to said first recirculation line and recirculated to said vessel to a point above the level of the remaining pulp slurry, the improvement comprising cooling the formed pulp slurry and adjusting the alkalinity of the entire pulp slurry to a desired pH between about pH 10.0 to about pH 6.5 comprising, diverting the recirculating pulp slurry to a second recirculation line juxtaposed to said first end of said first recirculation line, contacting said recirculating pulp slurry in said second recirculation line with an acidifying agent comprising carbon dioxide and introducing the acidified recirculated pulp slurry into an opposing side of said vessel at a point below the level of said remaining pulp slurry and effecting mixing of said acidified recirculated pulp slurry with said remaining pulp slurry.

2. A method of claim 1 wherein said improvement is conducted following the completion of pulping in said vessel and prior to removal of said pulp slurry through a dump line.

3. A method of claim 1 wherein said acidifying agent adjusts the alkalinity of said pulp slurry to a desired pH between about pH 7.0 to about pH 9.0.

4. A method of claim 3 wherein the pH is adjusted to about pH 8.0.

5. A method of claim 1 wherein said acidifying agent comprising carbon dioxide is injected into said recirculation line.

6. A method of claim 5 wherein said carbon dioxide is substantially in a vapor state.

7. A method of claim 5 wherein said carbon dioxide is substantially in a liquid state.

8. A method of claim 5 wherein said carbon dioxide is partially in the vapor state and partially in the liquid state.

9. A method of claim 1 wherein the improvement further comprises at least one additional recirculation line for recirculating another portion of said pulp slurry to said vessel at another point below said remaining pulp slurry.

10. A method of claim 9 wherein said acidifying agent comprising carbon dioxide is injected into each of said second recirculation line and said additional recirculation line.

* * * * *